(12) United States Patent
Roffman et al.

(10) Patent No.: US 6,364,482 B1
(45) Date of Patent: Apr. 2, 2002

(54) CONTACT LENS USEFUL FOR AVOIDING DRY EYE

(75) Inventors: Jeffrey H. Roffman, Jacksonville, FL (US); Michel Guillon, London (GB)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 09/433,150

(22) Filed: Nov. 3, 1999

(51) Int. Cl.[7] .................................................. G02C 7/04
(52) U.S. Cl. .............................. 351/160 H; 351/160 R; 351/177
(58) Field of Search ........................ 351/160 R, 160 H, 351/161, 162, 177

(56) References Cited

U.S. PATENT DOCUMENTS

| 4,601,556 A | 7/1986 | Siviglia |
| 5,452,031 A | 9/1995 | Ducharme |
| 6,099,121 A | * 8/2000 | Chapman et al. ........ 351/160 H |

FOREIGN PATENT DOCUMENTS

| EP | 00700006 A1 | 1/1983 |
| EP | 0742462 A3 | 11/1996 |
| EP | 07642462 A2 | 11/1996 |
| GB | 2327283 A | 1/1999 |
| WO | WO90/09610 | 8/1990 |
| WO | WO95/09377 | 4/1995 |

* cited by examiner

Primary Examiner—Scott J. Sugarman
(74) Attorney, Agent, or Firm—Lois Gianneschi

(57) ABSTRACT

The invention provides contact lenses designed to accommodate lens wearer's that may develop dry eye. The lenses of the invention are of a design that decreases or substantially eliminates the occurrence of dry eye in the lens wearer.

20 Claims, 1 Drawing Sheet

CONTACT LENS USEFUL FOR AVOIDING DRY EYE

FIELD OF THE INVENTION

The invention relates to contact lenses. In particular, the invention provides contact lenses designed to decrease or eliminate the occurrence of dry eye in the lens wearer.

BACKGROUND OF THE INVENTION

The use of contact lenses for correction of visual acuity defects is widely accepted. However, the use of conventional contact lenses may alter the state of the eye's tear film causing excessive tear evaporation and resulting in the condition known as dry eye, a condition that causes discomfort and may cause corneal injury. Known methods for avoiding dry eye include using loose fitting contact lenses or lenses with flatter base curves than the conventional lens. These methods are disadvantageous because the lenses are uncomfortable to wear. Alternatively, dry eye has been treated with eye drops, which is inconvenient, or by discontinuing lens wear, which is undesirable.

Therefore, a need exists for improved contact lenses. Specifically, a need exists for a lens that overcomes or avoids the occurrence of dry eye in the lens wearer.

DETAILED DESCRIPTION OF THE INVENTION AND PREFERRED EMBODIMENTS

The invention provides lenses, and methods for their production, that can eliminate dry eye. It is a discovery of the invention that lenses with smoother front, or convex surfaces, in comparison to conventional lenses help reduce or substantially eliminate the occurrence of dry eye.

Figure 1:
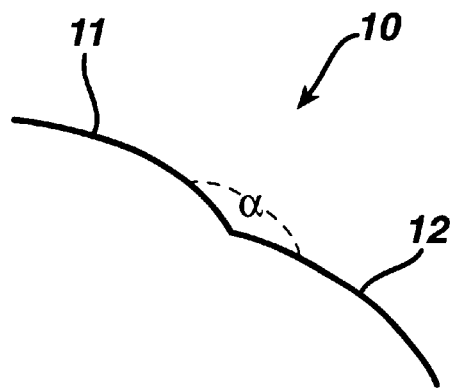
FIG. 1 depicts a magnified cross-sectional view of a portion of a lens of the prior art.

In conventional contact lenses, such as lens 10 shown in FIG. 1, an angle α is formed by the junction of the central optic zone 11 with the peripheral, non-optical lenticular zone 12. The reason for the angle formation is the difference in radius of curvature between the optic and lenticular zones. The size of the angle formed at this junction will increase with increases in the lens' power. Taken across a broad power range, conventional lenses typically have an angle of about 3° or more and may have an angle of as much as 18°.

The present invention provides contact lenses having smoother convex surfaces than conventional lenses. The smoothness of the front surface of the lenses of the invention is achieved by decreasing the angle formed by the junction of the optic and lenticular zones to less than or equal to about 1 degree, regardless of the lenses' power. Therefore, in one embodiment, the invention provides a contact lens comprising, consisting essentially of, and consisting of a central optic zone and a peripheral lenticular zone, wherein the junction between the optic zone and lenticular zone forms an angle of less than or equal to about 1 degree.

Figure 2:
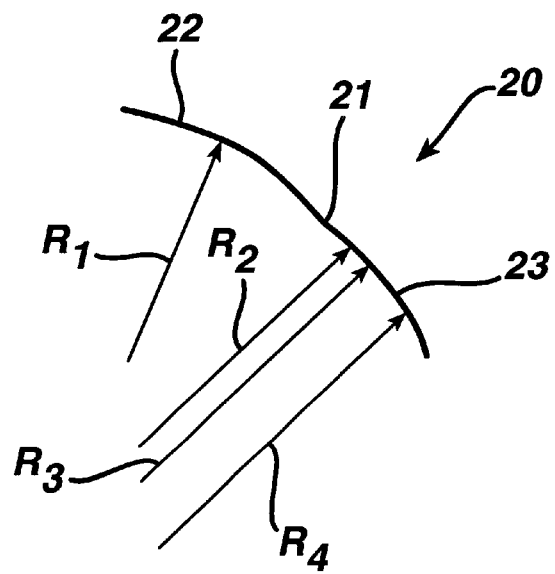
FIG. 2 depicts a magnified cross-sectional view of a portion of a lens of the invention.

In one embodiment of the invention, the decrease in the optic zone-lenticular zone angle is obtained by using more than one radius of curvature in forming the lenticular zone. FIG. 2 is a cross-sectional depiction of a lens 20 in which front surface 21 has a smooth junction between the central optic zone 22 and the lenticular zone 23, which is a an annular zone, due to the use of multiple radii of curvatures to form lenticular zone 23. The annular zone may be of any suitable cross-sectional shape including, without limitation, spherical, aspherical, polynomial, spline, coaxial to the lens' central radius, off-axis, or the like. Preferably, it is spherical or aspherical, more preferably spherical. The annular zone may be about 0.25 to about 1.5 mm, preferably about 1.0 mm in width. In an alternative embodiment, at least one additional annular zone, concentric to the first annular zone is used to suit the lens design desired, which additional zone does not have to be of the same cross-sectional shape as that of the first annular zone.

In an alternative embodiment, a profile is created of the lenticular zone of the lens by fitting spline curves to the lens periphery to describe each zone desired within the lenticular zone. In this embodiment, nodes are at each end of a zone described by a spline curve. Thus, nodes make up the innermost portion of the lenticular zone, or the portion closest to the optic zone.

By diminishing or substantially eliminating the optic zone-lenticular zone junction angle, the ability of the lens to break up the pre-lens tear film and cause dry eye is diminished. In this way, better wetting of the lens while it is worn is achieved and the development of dry eye may be reduced or substantially eliminated.

Although the lenses of the invention may be hard or soft lenses, preferably the material selected for forming the lenses of the invention is a material suitable for producing soft contact lenses. Suitable preferred materials for forming soft contact lenses using the method of the invention include, without limitation, silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

The lenses of the invention may be produced by any conventional method for producing contact lenses. For example, the lens design may be cut into a metal and the metal used to produce plastic mold inserts for the lens' surfaces. A suitable liquid resin is then placed between the inserts, the inserts compressed, and the resin cured to form the lens. Alternatively, the lens of the invention may be produced by cutting the lens on a lathe. One ordinarily skilled in the art will recognize that an advantage of the invention is that the lenses may be produced by the use of on-axis CNC lathing of the lenses or mold tools to produce the lenses.

What is claimed is:

1. A contact lens comprising a central optic zone and a peripheral lenticular zone, wherein the junction between the optic zone and lenticular zone of a convex surface of the lens forms an angle of less than or equal to about 1 degree.

2. The lens of claim 1, wherein a first annular zone surrounds the optic zone.

3. The lens of claim 2, wherein the first annular zone is of a cross-sectional shape selected from the group consisting of spherical, aspherical, polynomial, spline, coaxial to the lens' central radius, or off-axis.

4. The lens of claim 3, wherein the cross-sectional shape is spherical.

5. The lens of claim 3, wherein the cross-sectional shape is aspherical.

6. The lens of claim 3, wherein the first annular zone is about 0.25 to about 1.5 mm.

7. The lens of claim 4, wherein the first annular zone is about 0.25 to about 1.5 mm.

8. The lens of claim 5, wherein the first annular zone is about 0.25 to about 1.5 mm.

9. The lens of claim 3, further comprising at least one additional annular zone, concentric to the first annular zone.

10. The lens of claim 9, wherein the at least one additional annular zone is of a same cross-sectional shape as the first annular zone.

11. The lens of claim 9, wherein the at least one additional annular zone is of a different cross-sectional shape as the first annular zone.

12. The lens of claim 1, wherein the lenticular zone comprises one or more splined radii.

13. A soft contact lens comprising a central optic zone and a peripheral lenticular zone, wherein the junction between the optic zone and lenticular zone of a convex surface of the lens forms an angle of less than or equal to about 1 degree and wherein a first annular zone surrounds the optic zone the first annular zone having a cross-sectional shape selected from the group consisting of spherical, aspherical, polynomial, spline, coaxial to the lens' central radius, or off-axis.

14. The soft contact lens of claim 13, wherein the cross-sectional shape is spherical.

15. A method for reducing the occurrence of dry eye in a contact lens wearer comprising the step of providing a contact lens comprising a central optic zone and a peripheral lenticular zone, wherein the junction between the optic zone and lenticular zone of a convex surface of the lens forms an angle of less than or equal to about 1 degree.

16. The process of claim 15, wherein the process further comprises the step of providing a first annular zone surrounding the optic zone.

17. The process of claim 16, wherein the first annular zone is of a cross-sectional shape selected from the group consisting of spherical, aspherical, polynomial, spline, coaxial to the lens' central radius, or off-axis.

18. The lens of claim 17, wherein the cross-sectional shape is spherical.

19. The lens of claim 17, wherein the cross-sectional shape is aspherical.

20. The lens of claim 15, further comprising the step of providing a lenticular zone comprising one or more splined radii.

* * * * *